US012583369B2

(12) United States Patent
Bade et al.

(10) Patent No.: US 12,583,369 B2
(45) Date of Patent: Mar. 24, 2026

(54) STOWING VEHICLE SEAT WITH BREAK LINK MECHANISM

(71) Applicant: Atieva, Inc., Newark, CA (US)

(72) Inventors: Kailas Bade, Newark, CA (US);
Gurminder Rai, Newark, CA (US);
Jeff Carroll, Newark, CA (US); David Williams, Newark, CA (US)

(73) Assignee: Atieva, Inc., Newark, CA (US)

( * ) Notice: Subject to any disclaimer, the term of this patent is extended or adjusted under 35 U.S.C. 154(b) by 214 days.

(21) Appl. No.: 18/501,862

(22) Filed: Nov. 3, 2023

(65) Prior Publication Data

US 2025/0145059 A1     May 8, 2025

(51) Int. Cl.
| | |
|---|---|
| *B60N 2/30* | (2006.01) |
| *B60N 2/06* | (2006.01) |
| *B60N 2/08* | (2006.01) |
| *B60R 5/04* | (2006.01) |

(52) U.S. Cl.
CPC ........... *B60N 2/065* (2013.01); *B60N 2/0806* (2013.01); *B60N 2/0837* (2013.01); *B60N 2/3075* (2013.01); *B60R 5/044* (2013.01)

(58) Field of Classification Search
CPC .............................. B60N 2/3075; B60N 2/065
See application file for complete search history.

(56) References Cited

U.S. PATENT DOCUMENTS

| | | | | |
|---|---|---|---|---|
| 1,062,010 | A | 5/1913 | Jacobson | |
| 7,134,725 | B2 * | 11/2006 | Hofmann ............. | B60N 2/3065 |
| | | | | 297/15 X |

| | | | | |
|---|---|---|---|---|
| 7,201,426 | B2 * | 4/2007 | Villeminey .......... | B60N 2/3075 |
| | | | | 296/65.09 |
| 7,784,860 | B2 * | 8/2010 | Schacht ................ | B60N 2/305 |
| | | | | 297/15 X |
| 7,850,220 | B2 * | 12/2010 | Holdampf ............ | B60N 2/3075 |
| | | | | 297/15 X |
| 9,302,600 | B2 * | 4/2016 | Zeimis, III ............. | B60N 2/309 |
| 9,333,883 | B2 * | 5/2016 | Abe ...................... | B60N 2/2227 |
| 9,821,684 | B2 * | 11/2017 | Abe ...................... | B60N 2/3045 |
| 10,040,373 | B2 | 8/2018 | Rawlinson et al. | |

(Continued)

FOREIGN PATENT DOCUMENTS

EP          0738624  B1      4/1999

OTHER PUBLICATIONS

International Search Report and Written Opinion for PCT Application No. PCT/US2024/054384, mailed on Feb. 24, 2025, 13 pages.

*Primary Examiner* — Rodney B White
(74) *Attorney, Agent, or Firm* — Brake Hughes Bellermann LLP

(57)                    ABSTRACT

A vehicle seat comprises: a cushion frame; a backrest frame; at least one main link extending between a first pivot at the cushion frame and a first fixed pivot to be mounted to a vehicle body of a vehicle, wherein the at least one main link is configured to support substantially an entire load on the vehicle seat; and a break link extending between a second pivot at the cushion frame and a second fixed pivot to be mounted to the vehicle body, the break link comprising first and second members joined to each other at a third pivot, wherein one of the first or second members has a pin that extends into an elongate slot on another of the first or second members.

20 Claims, 12 Drawing Sheets

(56) References Cited

U.S. PATENT DOCUMENTS

| 10,336,222 | B2 * | 7/2019 | Jensen | ................. | B60N 2/3075 |
|---|---|---|---|---|---|
| 10,406,956 | B2 * | 9/2019 | White | .................. | B60N 2/3075 |
| 10,518,667 | B2 * | 12/2019 | Abe | ......................... | B60N 2/10 |
| 10,675,998 | B2 * | 6/2020 | Jensen | ................. | B60N 2/3072 |
| 10,953,773 | B2 | 3/2021 | Moon et al. | | |
| 2006/0097538 | A1 | 5/2006 | Villeminey | | |
| 2009/0243323 | A1 * | 10/2009 | Mitsuhashi | .......... | B60N 2/3065 |
| | | | | | 296/65.05 |

* cited by examiner

100

100

106

104

102

STOWING VEHICLE SEAT WITH BREAK LINK MECHANISM

TECHNICAL FIELD

This document relates to a stowing vehicle seat with a break link mechanism.

BACKGROUND

Vehicle seats can be designed for the dual purposes of providing a seat for an occupant and for being folded to facilitate use of a load floor for luggage or other vehicle cargo. Some existing vehicles allow seats to be folded to provide a substantially flat load floor. However, the mechanical approaches that have been used have provided relatively simple kinematics. As a result, these folding seats may claim an undue amount of space in the vehicle and therefore require generous packaging constraints in the vehicle design. For example, in some cases the resulting load floor of such seats has a high load level.

SUMMARY

In a first aspect, a vehicle seat comprises: a cushion frame; a backrest frame; at least one main link extending between a first pivot at the cushion frame and a first fixed pivot to be mounted to a vehicle body of a vehicle, wherein the at least one main link is configured to support substantially an entire load on the vehicle seat; and a break link extending between a second pivot at the cushion frame and a second fixed pivot to be mounted to the vehicle body, the break link comprising first and second members joined to each other at a third pivot, wherein one of the first or second members has a pin that extends into an elongate slot on another of the first or second members.

Implementations can include any or all of the following features. The at least one main link and the break link are configured to transition between acting as a five-bar link and acting as a four-bar link. The five-bar link comprises: a first bar including the at least one main link; a second bar comprising a portion of the vehicle body between the first and second fixed pivots; a third bar comprising the first member, wherein the first member extends at least between the second fixed pivot and the third pivot; a fourth bar comprising the second member, wherein the second member extends at least between the third pivot and the second pivot; and a fifth bar comprising a portion of the cushion frame between the second pivot and the first pivot. The four-bar link comprises: a first bar including the at least one main link; a second bar comprising a portion of the vehicle body between the first and second fixed pivots; a third bar comprising the break link; and a fourth bar comprising a portion of the cushion frame between the second pivot and the first pivot. The elongate slot includes a first end opposite a second end, and wherein the break link is locked by the pin abutting the first end. The vehicle seat further comprises a biasing member that biases the pin toward the first end, the biasing member positioned at the other of the first or second members that has the elongate slot. The biasing member comprises a clock spring. The first member extends at least between the second fixed pivot and the third pivot. The vehicle seat further comprises a riding pin on the first member, wherein the break link is unlocked by the riding pin riding on the main link. The pin and the riding pin are substantially parallel to each other. The at least one main link and the break link are configured to transition from initially acting as a five-bar link, thereafter into acting as a four-bar link when the break link is locked, and thereafter into again acting as the five-bar link when the break link is unlocked. The elongate slot is positioned on the first member, and wherein the elongate slot is positioned at an opposite side of the third pivot from the first fixed pivot. The first member has an angled end at the opposite side of the third pivot, and wherein the elongate slot is positioned on the angled end. The second member is straight between the third pivot and the second pivot. The vehicle seat comprises first and second main links, the first main link extending between the first pivot and the first fixed pivot, the second main link extending between a fourth pivot at the cushion frame and a third fixed pivot to be mounted to the vehicle body, wherein the first and second main links are configured to support substantially the entire load on the vehicle seat. The first and third fixed pivots are positioned side by side in a transverse direction of the vehicle, and wherein the first and second main links are positioned side by side in the transverse direction of the vehicle. The break link is positioned to a side of the first and second main links in the transverse direction. The break link is positioned inboard of the first and second main links in the vehicle. The vehicle seat further comprises a bracket for mounting the first and third fixed pivots to the vehicle body. The vehicle seat is configured to assume a use position and a stowed position. In at least the stowed position the backrest frame is folded to be substantially parallel with, and at least partially overlapping, the cushion frame. The vehicle seat is configured to be transitioned from the use position to the stowed position by being stowed in a rearward direction relative to the vehicle.

In a second aspect, a vehicle comprises: a vehicle body, the vehicle body including a tub compartment; and a first seat including a cushion frame and a backrest frame, the first seat mounted to the vehicle body by at least one first main link and a first break link, wherein the first seat is accommodated inside the tub compartment by being folded rearward from a use position into a stowed position.

Implementations can include any or all of the following features. The at least one first main link and the first break link are configured to transition between acting as a five-bar link and acting as a four-bar link. The at least one first main link is attached to the vehicle body inside the tub compartment. The first break link is attached to the vehicle body inside the tub compartment. The at least one first main link is configured to support substantially an entire load on the first seat. The at least one first main link extends between a first pivot at the cushion frame and a first fixed pivot mounted to the vehicle body, wherein the first break link extends between a second pivot at the cushion frame and a second fixed pivot mounted to the vehicle body, the first seat further comprising a second main link extending between a fourth pivot at the cushion frame and a third fixed pivot to be mounted to the vehicle body. The first and second main links are configured to support substantially an entire load on the first seat. The first seat is configured to assume a use position and a stowed position. In the stowed position the backrest frame is folded to be substantially parallel with, and at least partially overlapping, the cushion frame. The first seat is configured to be transitioned from the use position to the stowed position by being stowed in a rearward direction relative to the vehicle. The vehicle further comprises a second seat having substantially similar components as the first seat.

BRIEF DESCRIPTION OF DRAWINGS

Like reference symbols in the various drawings indicate like elements.

DETAILED DESCRIPTION

Figure 1:
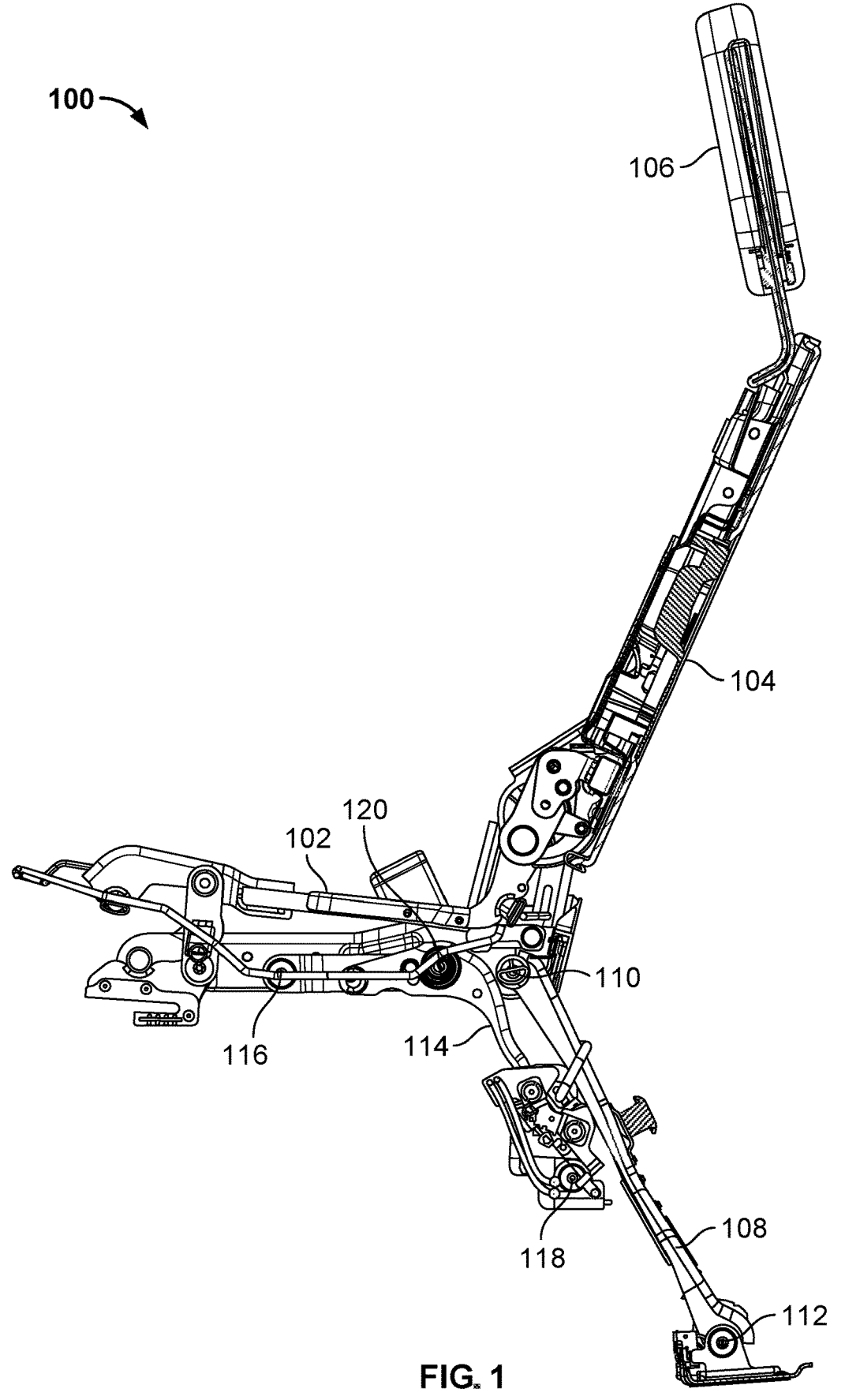
FIGS. 1-3 show side views of examples of a vehicle seat being transitioned between a use position and a folded position.

This document describes examples of systems and techniques for providing a vehicle seat with improved folding geometry and kinematics. In some implementations, the vehicle seat can be stowed when not used, the stowing being done by folding the vehicle seat in a rearward direction relative to the vehicle. This can increase the space available to store cargo. For example, the vehicle seat can be accommodated in a relatively modest space formed by a tub compartment located in the trunk area of the vehicle. For example, such stowing can allow the vehicle to provide a capacious storage area, with a sizeable load floor that is substantially flat (i.e., level when the vehicle is horizontal).

The present subject matter can provide improved seating and loading capability for different types of vehicles. In some implementations, the vehicle seat(s) used as examples in the present disclosure can be configured for being placed rear of a driver's seat in the vehicle, including, but not limited to, in a second row, a third row, or other subsequent row of seats. The vehicle seat(s) used as examples in the present disclosure can be used in a subsequent seat row of a sport utility vehicle, a crossover vehicle, a minivan, a station wagon, or another type of vehicle.

Examples herein refer to a vehicle. As used herein, a vehicle is a machine that transports passengers or cargo, or both. A vehicle can have one or more motors using at least one type of fuel or other energy source (e.g., electricity). Examples of vehicles include, but are not limited to, cars, trucks, and buses. The number of wheels can differ between types of vehicles, and one or more (e.g., all) of the wheels can be used for propulsion of the vehicle, or the vehicle can be unpowered (e.g., when a trailer is attached to another vehicle). The vehicle can include a passenger compartment accommodating one or more persons.

Examples herein refer to a main link of a vehicle seat. As used herein, a main link of a vehicle seat is a member that provides support for one or more types of load to which the vehicle seat may be subjected. For example, the main link can support occupant weight and dynamic loads such as the forces associated with acceleration and deceleration. A vehicle seat can have one or more main links, and the main link(s) can support substantially all of the loads for which the vehicle seat is designed.

Examples herein refer to a break link of a vehicle seat. As used herein, a break link is a mechanism that controls one or more aspects of the kinematics when the vehicle seat is transitioned between positions. For example, the vehicle seat can be brought from a use position to a stowed position, or vice versa. The break link may not support any of the loads of the vehicle seat.

Examples herein refer to a tub compartment in the body of a vehicle. As used herein, a tub compartment is a hollow space formed by the vehicle body in which a vehicle seat can be accommodated. The tub compartment may have any shape and sufficient volume that the vehicle seat (e.g., in a folded state) can entirely fit within the hollow space. For example, the tub compartment may be configured to be closed off by a lid both with and without the vehicle seat being stowed inside the tub compartment. A tub compartment located in a trunk area of the vehicle can be referred to as a sub trunk.

Examples described herein refer to a top, bottom, front, side, or rear. These and similar expressions identify things or aspects in a relative way based on an express or arbitrary notion of perspective. That is, these terms are illustrative only, used for purposes of explanation, and do not necessarily indicate the only possible position, direction, and so on.

In the following, examples of vehicle seats will be described, including some operations of folding/unfolding or stowing/deploying with regard to the seats. In some implementations, the seat movement can be at least partially automated by way of motorized operation powered by the vehicle itself. For example, a power recliner or other actuator can use electric energy to rotate and/or translate mechanical components relative to each other. In other implementations, the operation can be manual, meaning that the user manually provides the necessary force. As such, the following description covers both automated and manual operation.

Figure 2:
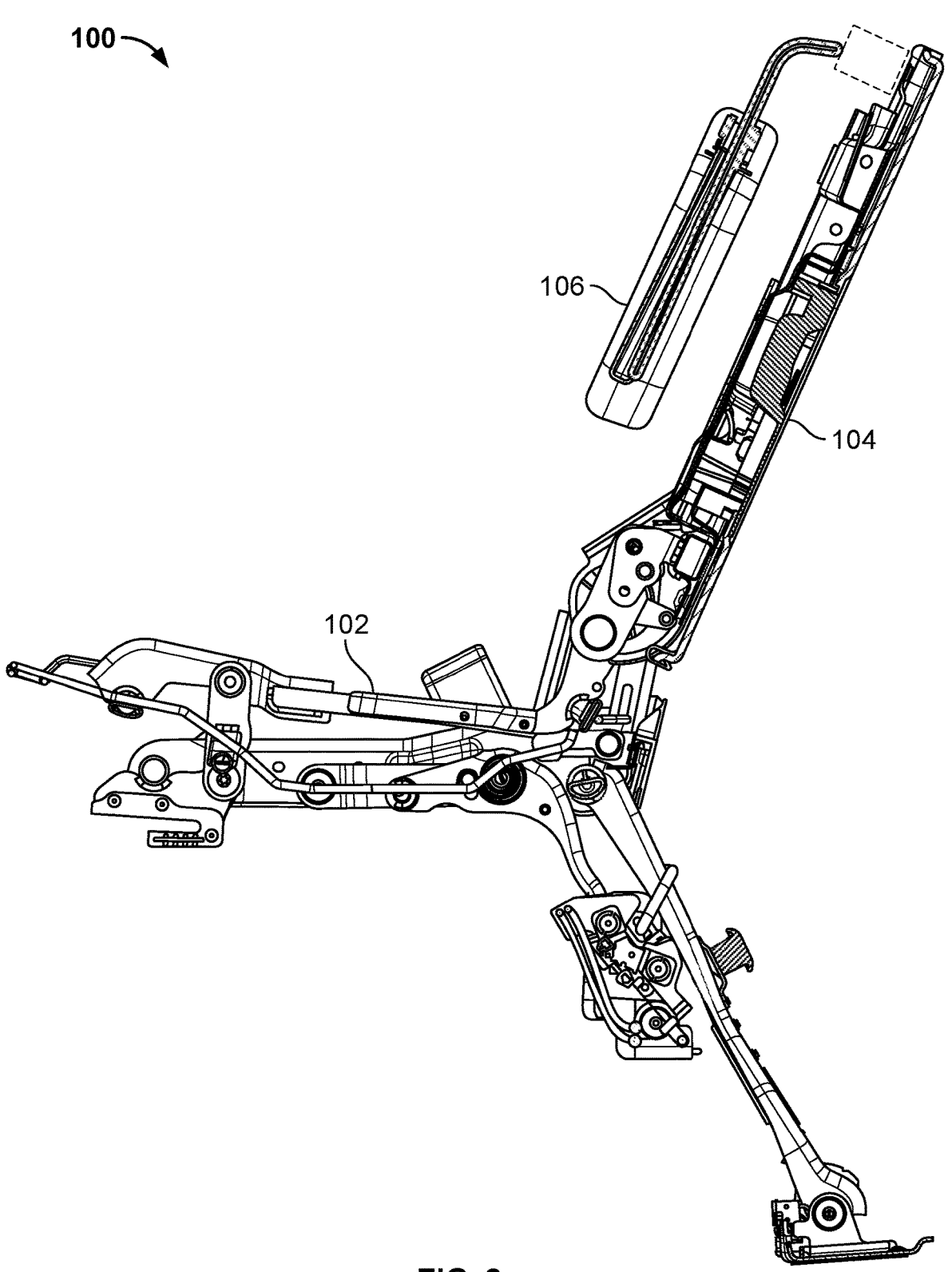
Figure 3:
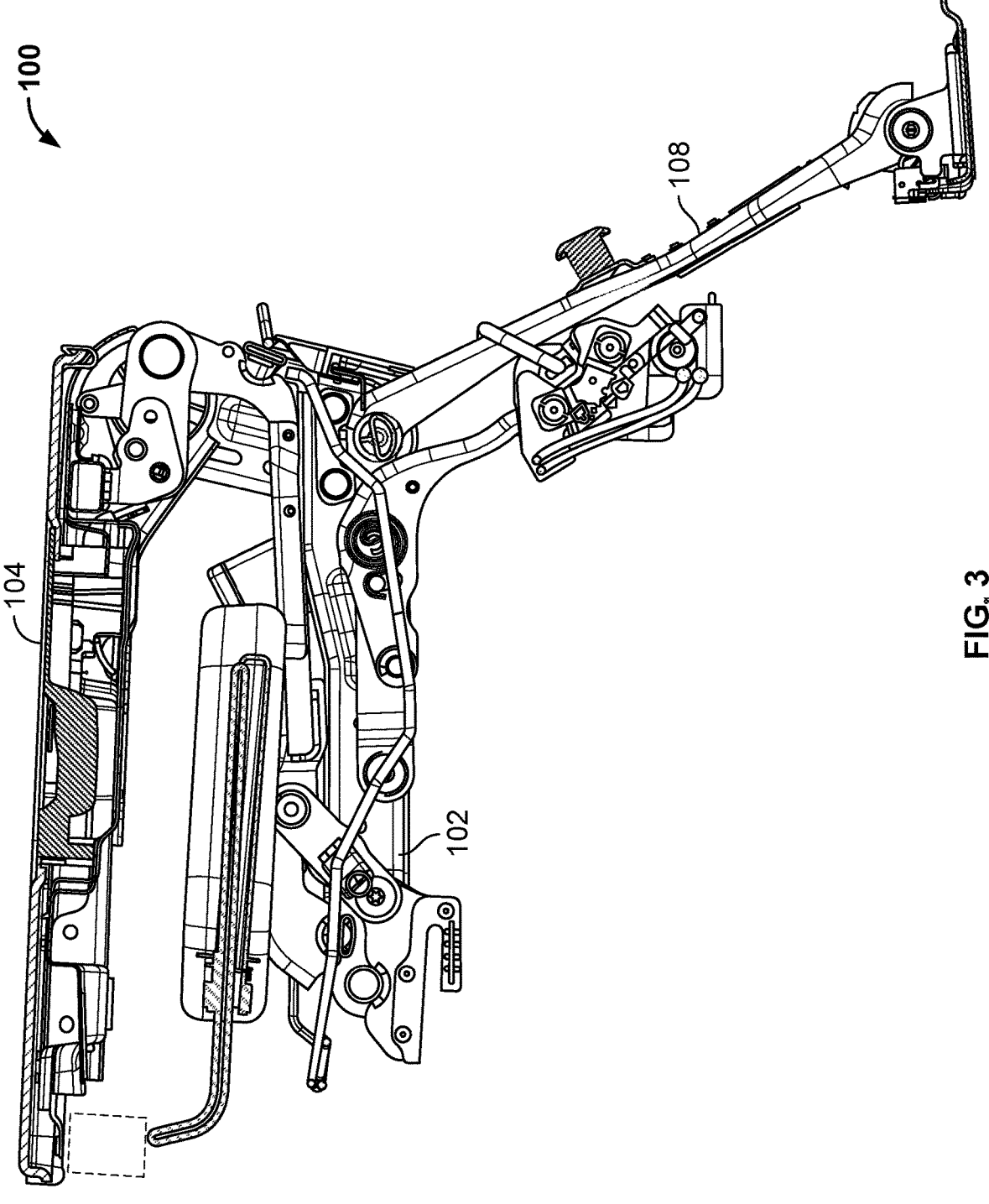

FIGS. 1-3 show side views of examples of a vehicle seat 100 being transitioned between a use position and a folded position. The vehicle seat 100 can be used with one or more other examples described elsewhere herein.

The vehicle seat 100 includes a cushion frame 102 and a backrest frame 104. For example, the cushion frame 102 can be provided with a seat cushion, and the backrest frame 104 with a backrest cushion, for the occupant's comfort. A headrest 106 here extends from an end of the backrest frame 104. The illustrations included herein typically do not show most of the cushions or other trim of the vehicle seat for purposes of illustration.

In FIG. 1, the vehicle seat 100 is shown in a use position. In some implementations, the use position can be designed to accommodate a sitting occupant in the vehicle seat 100. For example, either or both of the cushion frame 102 or the backrest frame 104 can be adjustable, while the vehicle seat 100 is in the use position, into any of multiple comfort positions based on the occupant's preference and/or depending on the size of the occupant. The examples described with reference to FIGS. 1-3 illustrate that the vehicle seat 100 can be transitioned from the use position into a folded position in which the vehicle seat 100 takes up less volume in the vehicle. For example, the folded position allows the vehicle seat 100 to then be stowed in a tub compartment of the vehicle to further increase the available cargo space.

The vehicle seat 100 includes at least one main link 108. The at least one main link 108 can be configured to support substantially an entire load on the vehicle seat 100. The main link 108 extends between a pivot 110 at the cushion frame 102 and a fixed pivot 112. The fixed pivot 112 is to be mounted to a vehicle body of a vehicle. In some implementations, the fixed pivot 112 is mounted to a floor of the vehicle body. For example, the fixed pivot 112 can be attached to the vehicle body inside a tub compartment. The vehicle seat 100 includes a break link 114. The break link 114 extends between a pivot 116 at the cushion frame 102 and a fixed pivot 118. The fixed pivot 118 is to be mounted to the vehicle body. That is, each of the pivots 110 and 116 on the cushion frame 102 facilitates pivoting and will move when the cushion frame 102 moves, such as when the vehicle seat 100 is transitioned between use and stowed positions. Each of the fixed pivots 112 and 118, on the other hand, also facilitates pivoting but will not move when the cushion frame 102 moves.

FIG. 2 shows an example of a partial folding of the vehicle seat 100 from the use position in FIG. 1. Here, the headrest 106 has been folded relative to the backrest frame 104 compared to in the use position. The mechanism that facilitates folding of the headrest 106 is here schematically represented by a dashed outline. For example, a commercially available folding headrest hinge can be used. In the configuration shown in FIG. 2, the rest of the vehicle seat 100 may presently remain arranged substantially as in the use position shown in FIG. 1.

FIG. 3 shows an example of a folded position of the vehicle seat 100. The backrest frame 104 has been folded relative to the cushion frame 102. In some implementations, in at least the folded position the backrest frame 104 is folded to be substantially parallel with, and at least partially overlapping, the cushion frame 102. For example, the backrest frame 104 can here be characterized as being positioned substantially on top of the cushion frame 102. In the folded position, the vehicle seat 100 remains supported by the at least one main link 108.

Figure 4:
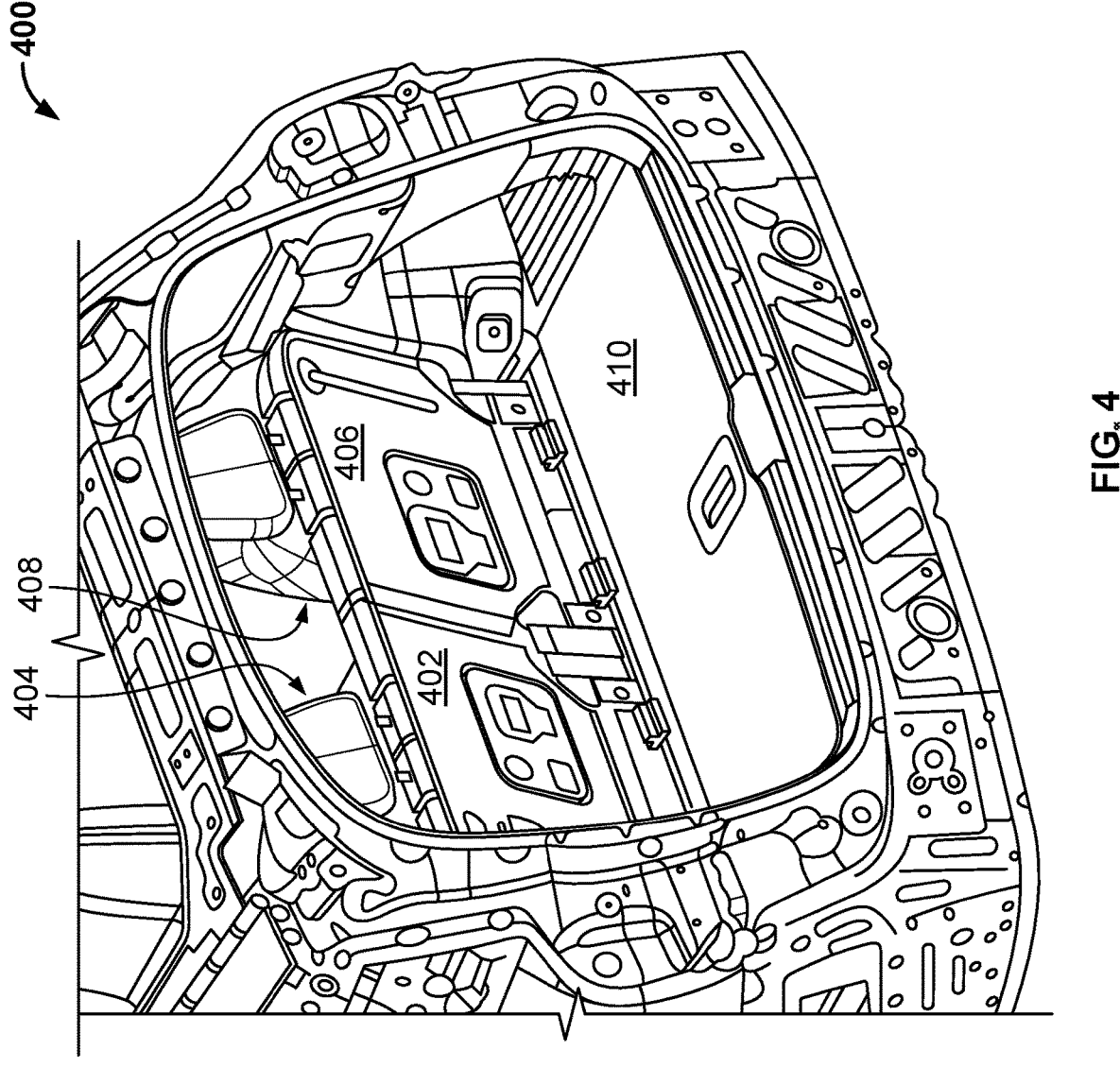
FIGS. 4-5 show perspective views of examples of a vehicle where the vehicle seat of FIGS. 1-3 can be used.
Figure 5:
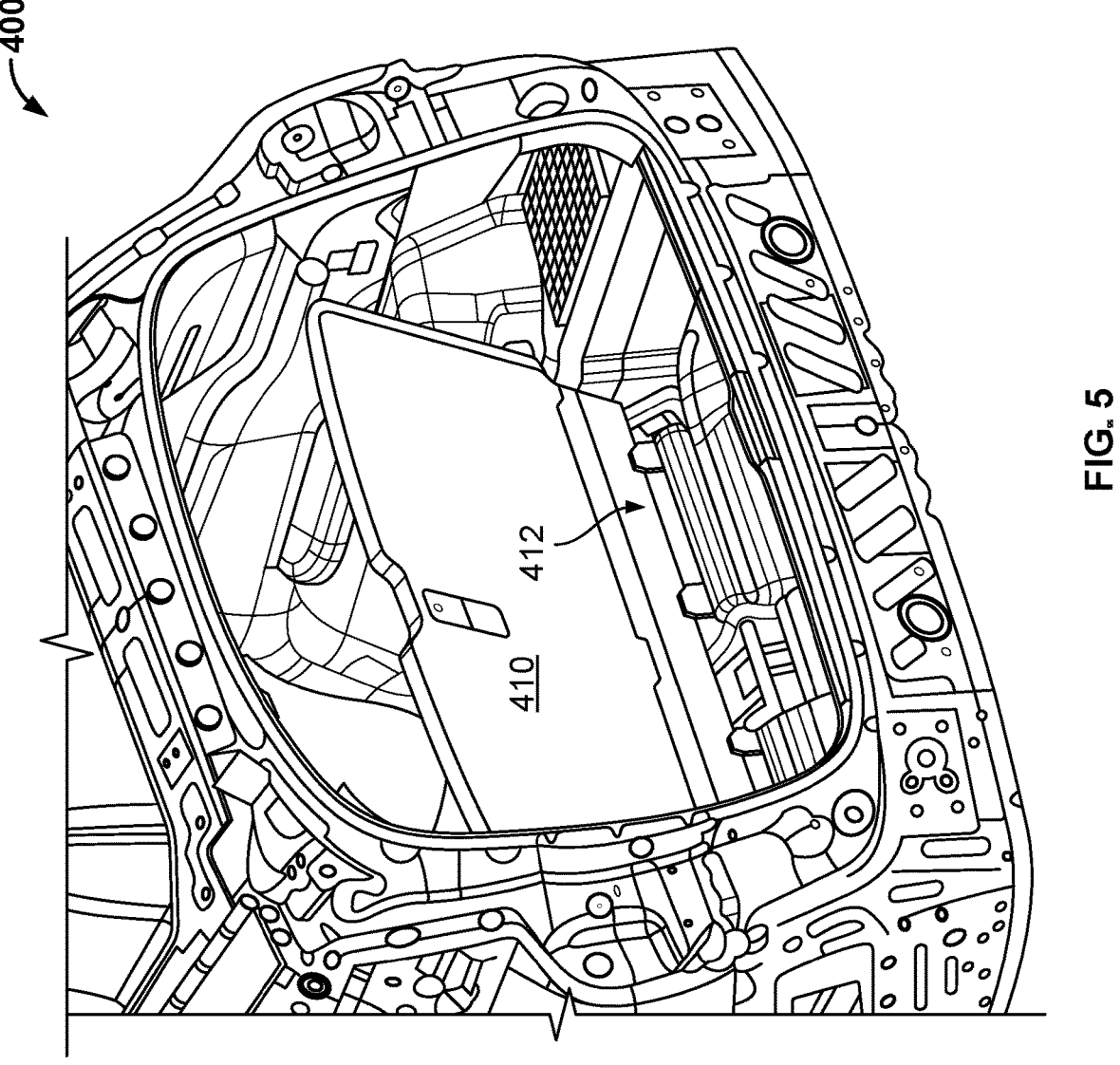

FIGS. 4-5 show perspective views of examples of a vehicle 400 where one or more of the vehicle seat of FIGS. 1-3 can be used. The vehicle 400 can be used with one or more other examples described elsewhere herein. For simplicity, only a portion of the vehicle 400 is shown and some details have been omitted from the shown aspects. That is, a rear of the vehicle 400 with a trunk area is shown in the present illustrations. The trunk area can be accessible at least through a trunk opening at the rear end of the vehicle 400, the trunk opening to be covered by a movable closure such as a liftgate or other trunk hood (not shown). A backrest 402 of a vehicle seat 404 is shown, as is a backrest 406 of a vehicle seat 408. Each of the vehicle seats 404 and 408 is an example of a vehicle seat according to the present subject matter. For example, the vehicle seats 404 and 408 can have substantially similar components as each other. In some implementations, the vehicle 400 has one or more subsequent seat rows behind a driver's seat. For example, the vehicle seats 404 and 408 can be positioned in a second or third row of the vehicle 400. The vehicle 400 has a tub compartment which in FIG. 4 is covered by a moveable floor 410.

FIG. 5 shows that the moveable floor 410 has been moved (e.g., pivoted) so that a tub compartment 412 is visible. In this illustration, the backrests 402 and 406 are not shown for simplicity. The tub compartment 412 is sized so as to accommodate stowing of the vehicle seats 404 and 408 at the same time. The vehicle seat 404 and/or 408 can be folded rearward in the vehicle 400 into its respective stowed position. That is, either or both of the vehicle seats 404 and 408 can be stowed inside the tub compartment 412, and the moveable floor 410 can then be replaced on top of the stowed vehicle seat(s) as shown in FIG. 4. If either of the vehicle seats 404 or 408 is not currently stowed in the tub compartment 412, that vehicle seat can remain in either its use position (e.g., as in FIG. 1) or in its folded position (e.g., as in FIG. 3).

Each of the vehicle seats 100 (FIGS. 1-3), 404 and/or 408 can include a linkage that facilitates space-efficient folding to enable stowing. In some implementations, the linkage can allow the vehicle seat to be stowed in a rearward direction in the vehicle. With reference to FIG. 1, such a linkage can include the at least one main link 108 and the break link 114. For example, the at least one main link 108 can be attached to the vehicle body inside the tub compartment 412. As another example, the break link 114 can also or instead be attached to the vehicle body inside the tub compartment 412. Examples regarding such linkages will now be described.

Figure 6:
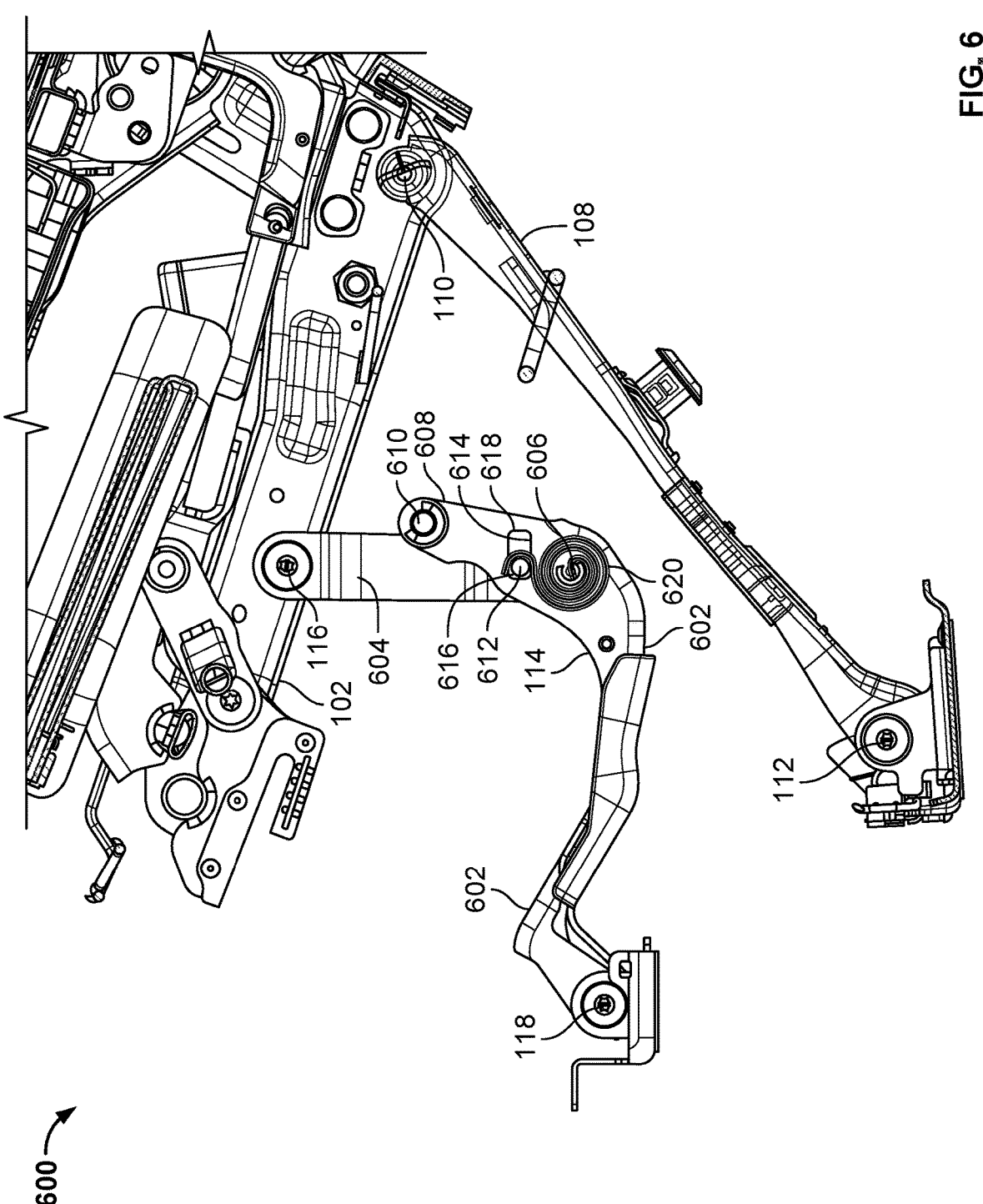
FIG. 6 shows a side view of an example of a linkage of the vehicle seat of FIGS. 1-3.

FIG. 6 shows a side view of an example of a linkage 600 of the vehicle seat 100 of FIGS. 1-3. The linkage 600 can be used with one or more other examples described elsewhere herein. The linkage 600 includes the at least one main link 108 and the break link 114. As mentioned, the break link 114 extends between the pivot 116 at the cushion frame 102 and the fixed pivot 118. The break link 114 includes a member 602 and a member 604 that are joined to each other at a pivot 606. The member 602 here extends from the fixed pivot 118 and past the pivot 606. Here, the member 602 has an end 608, wherein the pivot 606 is located between the fixed pivot 118 and the end 608 along the member 602. The member 602 can have a riding pin 610 at the end 608. The end 608 is here an angled end; for example, a line connecting the riding pin 610 and the pivot 606 with each other forms a nonzero angle with a line connecting the fixed pivot 118 and the pivot 606 with each other. The member 604 is here straight between the pivot 116 and the pivot 606.

The break link 114 can include a locking mechanism that facilitates one or more kinematics for the vehicle seat. Here, the locking mechanism includes a pin 612 that extends through an elongate slot 614. The pin 612 can be positioned on the member 604 and the elongate slot 614 can be positioned on the member 602, or vice versa. As such, the pin 612 can be positioned on one of the members 602 or 604, and the elongate slot 614 can be positioned on another of the members 602 or 604. Here, the pin 612 is positioned on the member 604 and the elongate slot 614 is positioned on the member 602. The elongate slot 614 is positioned on the member 602 at an opposite side of the pivot 606 from the fixed pivot 118. The elongate slot 614 can be positioned on the angled end of the member 602. The pin 612 and the riding pin 610 can be substantially parallel to each other.

The elongate slot 614 includes an end 616 opposite an end 618. Relative motion can occur between the pin 612 and the elongate slot 614. As the linkage 600 assumes respective different positions, the pin 612 can abut the end 616, or the pin 612 can abut the end 618, or the pin 612 can be positioned between the ends 616 and 618. A biasing member 620 biases the pin 612 toward the end 616. In some implementations, the biasing member 620 can be a clock spring. For example, the clock spring can be positioned on the member 602. In the present illustration, the pin 612 currently abuts the end 616.

As described above, FIG. 3 shows the vehicle seat 100 in a folded position. The vehicle seat 100 can be transitioned between the folded position of FIG. 3 and a stowed position to be shown and described in the following. The linkage 600 can facilitate such transitions. FIGS. 7-10 show side views of examples of the vehicle seat 100 of FIGS. 1-3 being transitioned between the folded position and a stowed position. The examples of FIGS. 7-10 can be used with one or more other examples described elsewhere herein.

Beginning with the vehicle seat 100 having the folded position of FIG. 3, this position can be referred to as a design position of the vehicle seat 100. The linkage 600 acts as a five-bar link in the design position. The folded position of FIG. 3 can be referred to as a five-link mechanism lock position. Referring now briefly to FIGS. 3 and 6, the five-bar link shown in FIG. 3 can include: a first bar including the at least one main link 108; a second bar comprising a portion of the vehicle body between the fixed pivots 112 and 118; a third bar comprising the member 602, wherein the member 602 extends at least between the fixed pivot 118 and the pivot 606; a fourth bar comprising the member 604, wherein the member 604 extends at least between the pivot 606 and the pivot 116; and a fifth bar comprising a portion of the cushion frame 102 between the pivot 116 and the pivot 110.

Figure 7:
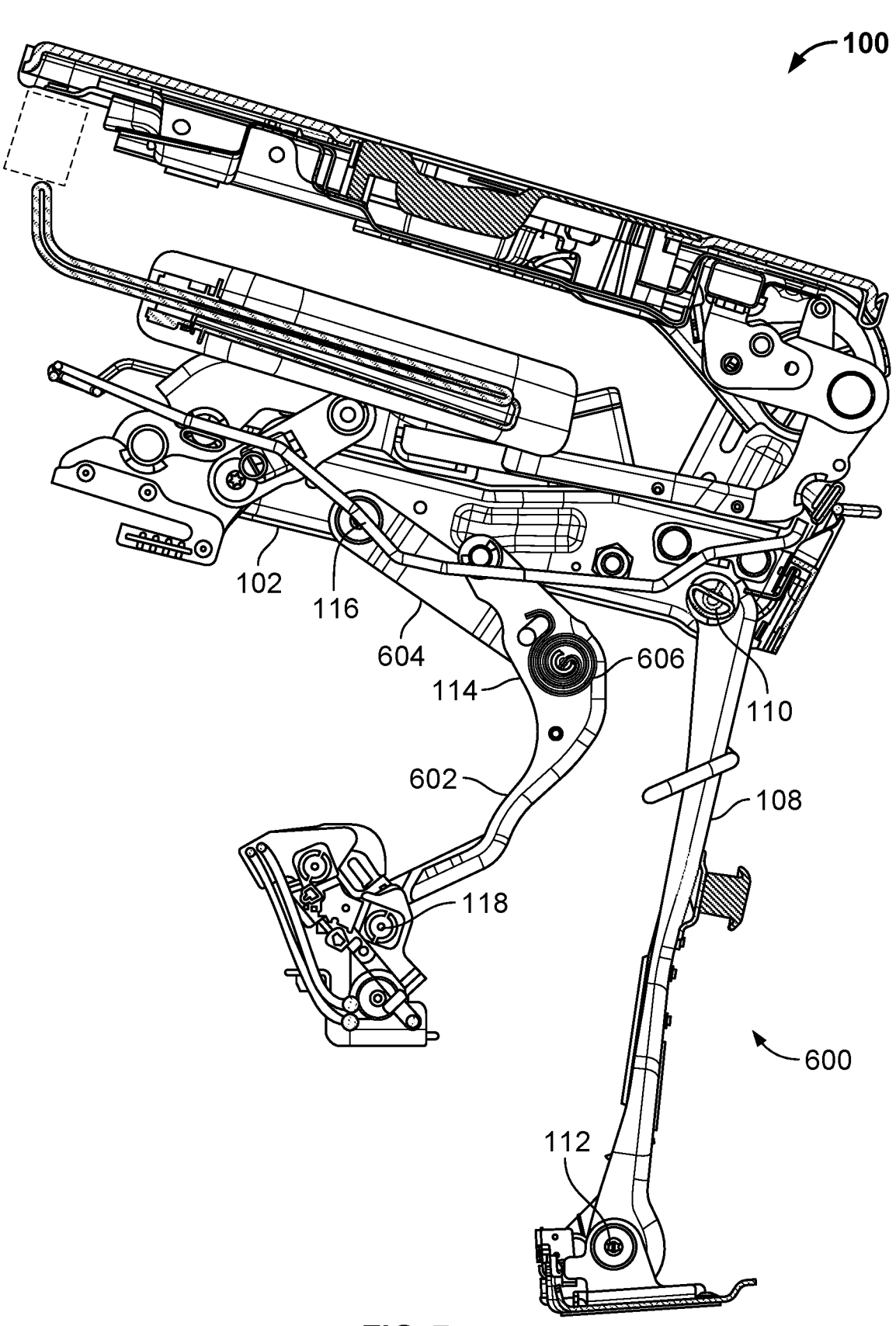
FIGS. 7-10 show side views of examples of the vehicle seat of FIGS. 1-3 being transitioned between the folded position and a stowed position.
Figure 8:
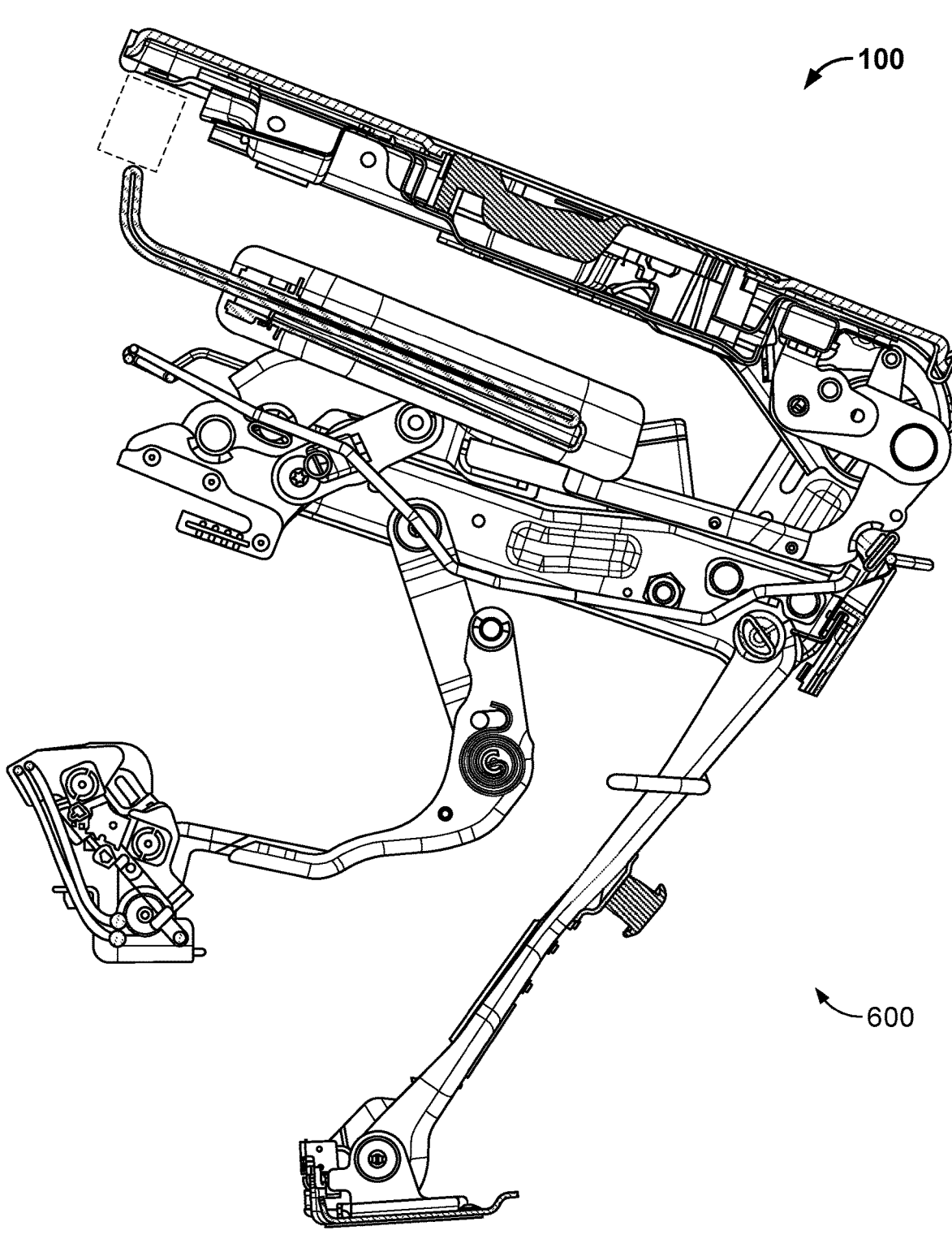

The beginning of the transition from the folded position can cause relative motion between the pin 612 and the elongate slot 614. When the pin 612 abuts the end 616 of the elongate slot 614, this can be referred to as a slot end contact state. For example, the linkage 600 is then in a five-bar to four-bar link lock position. The linkage 600 can continue to have the four-bar link lock position as the transition proceeds. FIG. 7 shows the vehicle seat 100 with the linkage 600 acting as a four-bar link during the transition. The four-bar link can include: a first bar including the at least one main link 108; a second bar comprising a portion of the vehicle body between the fixed pivots 112 and 118; a third bar comprising the break link 114; and a fourth bar comprising a portion of the cushion frame 102 between the pivot 116 and the pivot 110. In FIG. 8, the linkage 600 continues acting as a four-bar link during the transition.

Figure 9:
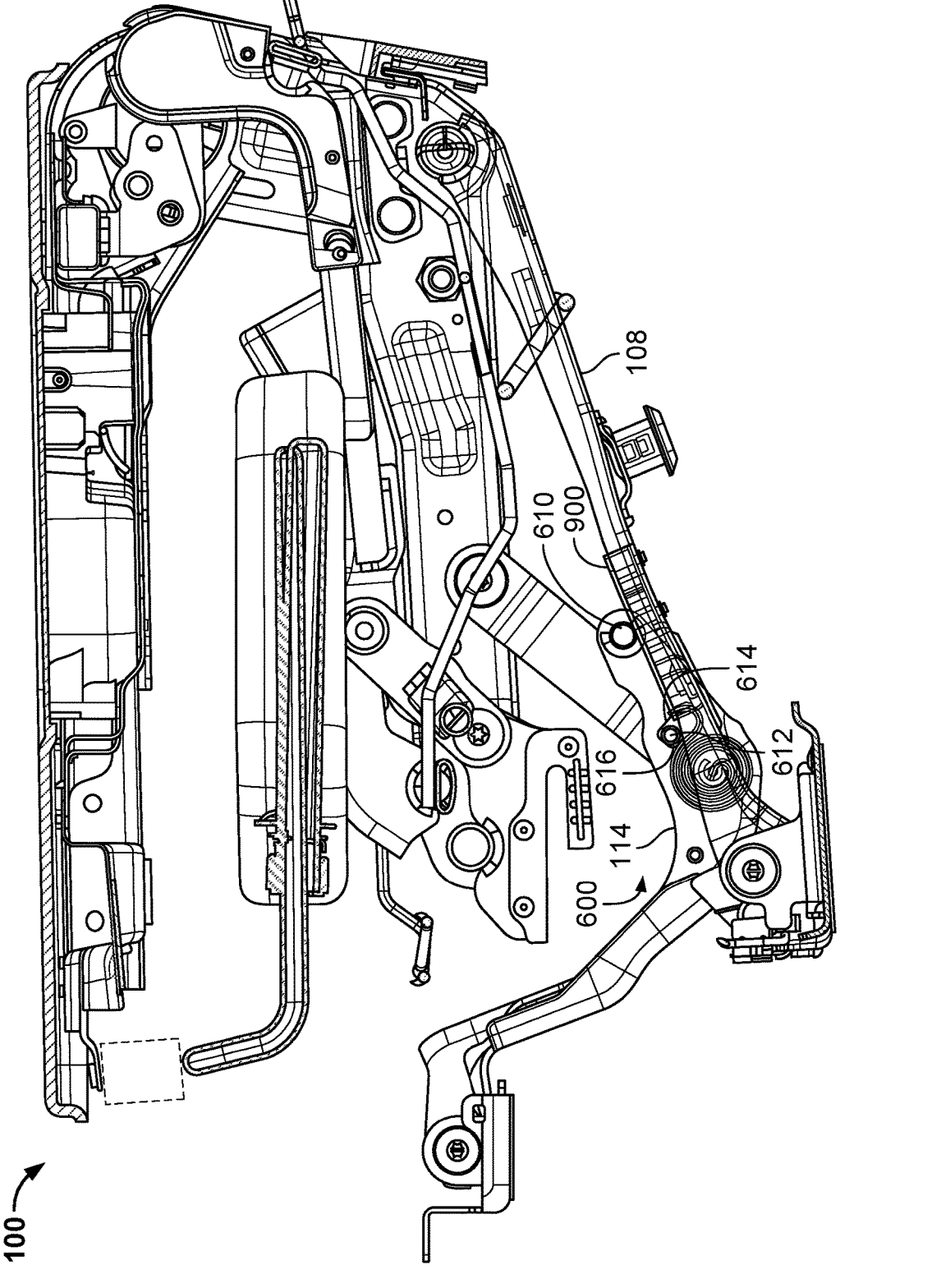

In FIG. 9, the vehicle seat 100 has been folded part of the way toward the stowed position. Here, the riding pin 610 abuts and begins to ride on a surface 900 of the at least one main link 108. The surface 900 can be made of any material, including but not limited to a plastic material. The riding pin 610 comes into contact with the surface 900 as part of the folding action and continues to ride on the surface 900 as a result of the ongoing transition motion of the linkage 600. The riding pin 610 can unlock the break link 114 by abutting the surface 900. When the riding pin 610 rides on the surface 900 this can load the biasing member 620. Particularly, the ongoing transition motion of the linkage 600 causes the pin 612 to be moved away from the end 616 of the elongate slot 614. The linkage 600 therefore transitions from a four-bar link to a five-bar link. That is, the linkage 600 initially acted as the five-bar link in the folded position of FIG. 3; thereafter the linkage 600 transitioned into a four-bar link, as shown in FIG. 7; finally the linkage 600 once again acts as a five-bar link, beginning approximately in the position shown in FIG. 9.

Figure 10:

FIG. 10 shows the vehicle seat 100 in the stowed position. The linkage 600 acts as a five-bar link in the stowed position. As mentioned, the vehicle seat 100 can be stowed inside the tub compartment 412 (FIG. 5). In the stowed position, the vehicle seat 100 occupies relatively little packaging space so that the vehicle seat 100 can be stowed without occupying significant space inside the vehicle. In at least the stowed position the backrest frame 104 is folded to be substantially parallel with, and at least partially overlapping, the cushion frame 102 (for example the parallel/overlapping folding can also occur in the folded position of FIG. 3). In at least the stowed position, a surface 1000 of the backrest frame 104 that is currently facing upward is oriented substantially in a horizontal direction. For example, this can facilitate placement of a low and substantially horizontal load floor (e.g., the moveable floor 410 in FIG. 4) above the vehicle seat 100 in the stowed position.

Figure 11:
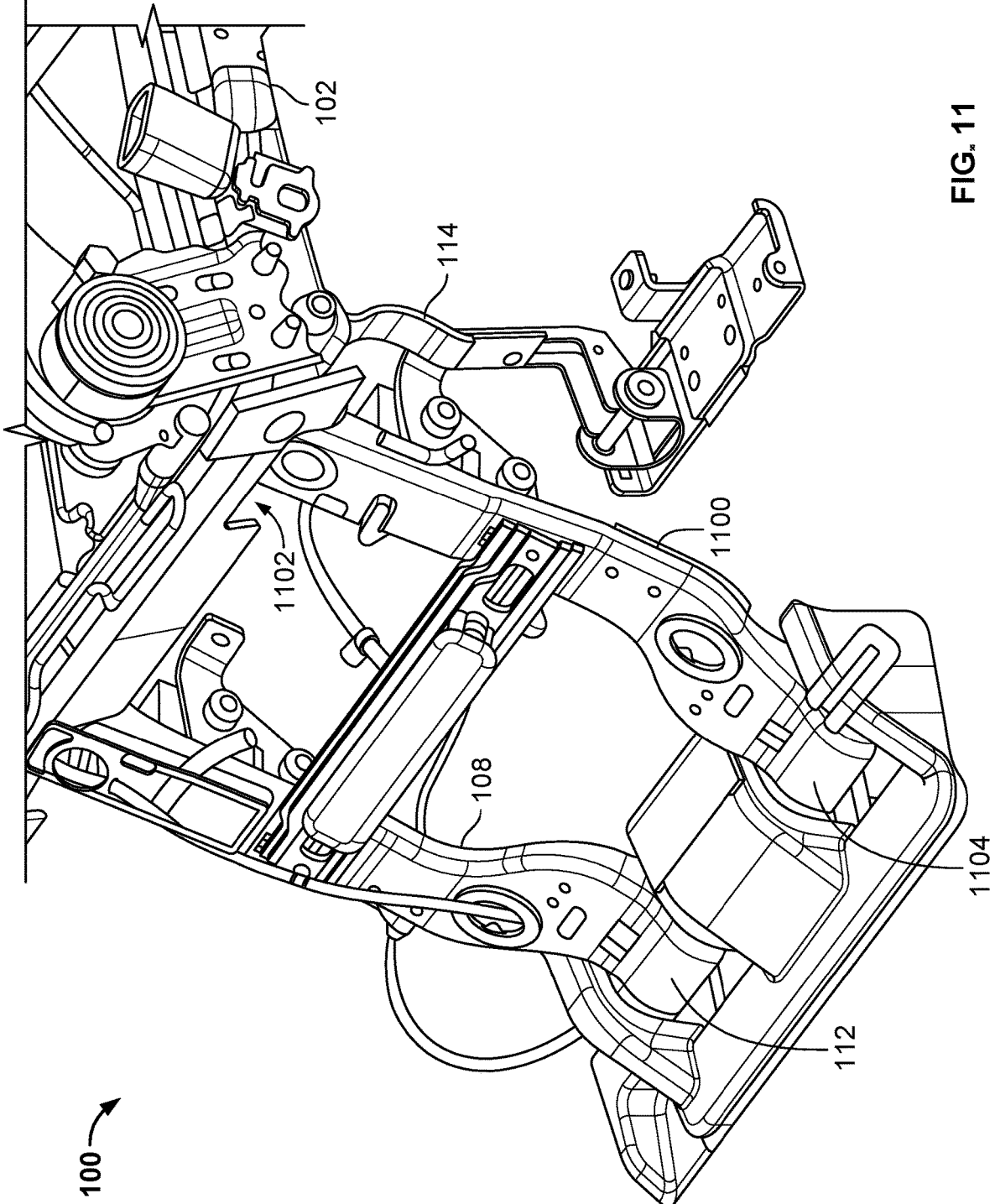
FIG. 11 shows a perspective view of an example of the main links of the vehicle seat of FIGS. 1-3.

FIG. 11 shows a perspective view of an example of the main link 108 and a main link 1100 of the vehicle seat 100 of FIGS. 1-3. That is, the vehicle seat 100 here has both the main link 108 and the main link 1100, and the main link 108 and the main link 1100 are configured to support substantially an entire load on the vehicle seat 100. The vehicle seat 100 with the main link 108 and the main link 1100 can be used with one or more other examples described elsewhere herein.

The main link 1100 extends between a pivot 1102 at the cushion frame 102 and a fixed pivot 1104. The fixed pivot 1104 is to be mounted to a vehicle body of a vehicle. In some implementations, the fixed pivot 1104 is mounted to a floor of the vehicle body. For example, the fixed pivot 1104 can be attached to the vehicle body inside a tub compartment (e.g., the tub compartment 412 in FIG. 5). The vehicle seat 100 includes the break link 114 as mentioned above. The fixed pivots 112 and 1104 can be positioned side by side in a transverse direction of the vehicle. The main links 108 and 1100 can be positioned side by side in the transverse direction of the vehicle. The break link 114 is positioned to a side of the main links 108 and 1100 in the transverse direction. In some implementations, the break link 114 is positioned inboard (i.e., away from a door or other side of the vehicle) relative to the main links 108 and 1100. For example, in FIG. 4 each of the vehicle seats 404 and 408 can have its respective break link near the longitudinal centerline of the vehicle.

Figure 12:
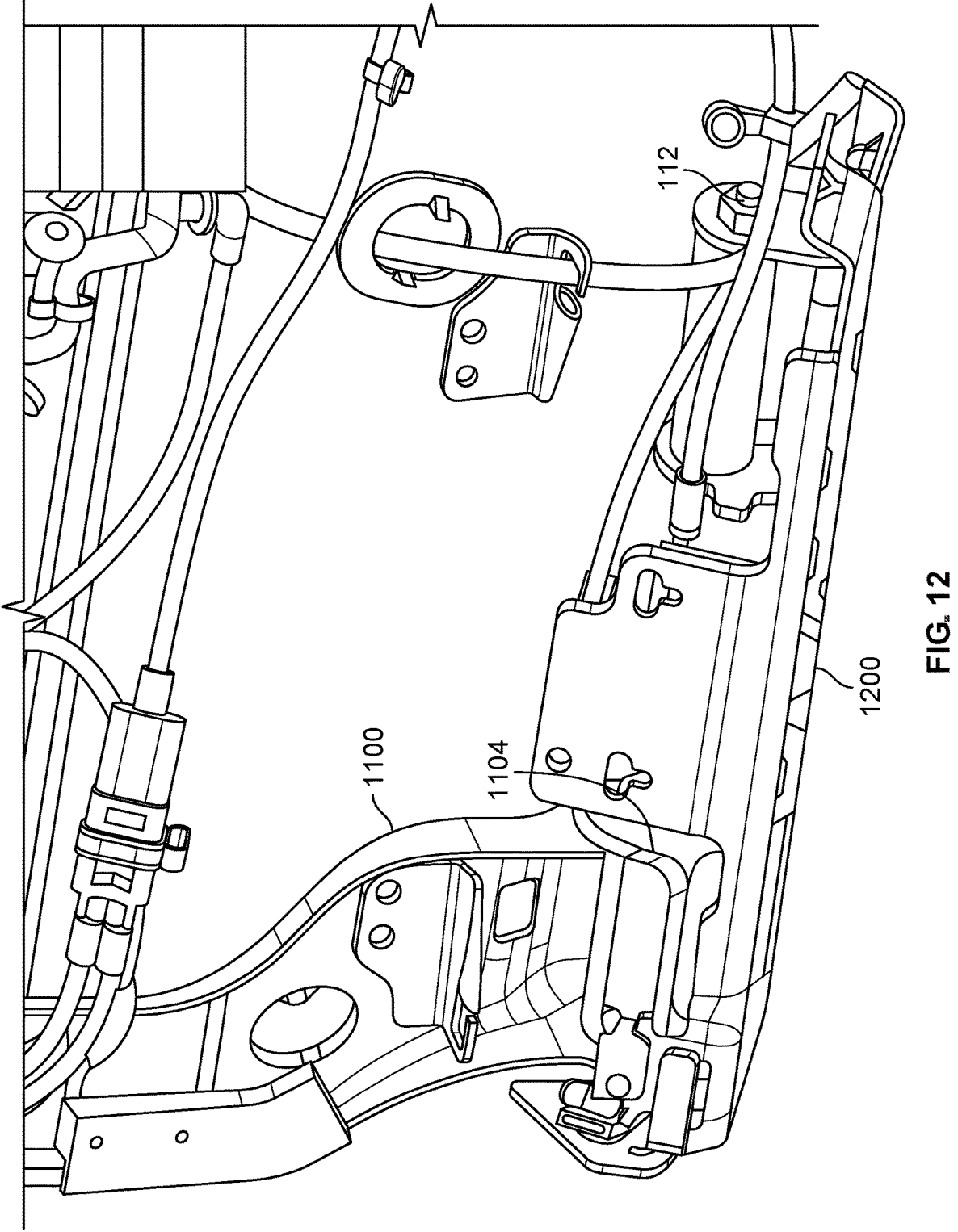
FIG. 12 shows a perspective view of an example of a bracket for the fixed pivots of the vehicle seat of FIGS. 1-3.

FIG. 12 shows a perspective view of an example of a bracket 1200 for the fixed pivots of the vehicle seat of FIGS. 1-3. The bracket 1200 is shown from the opposite direction compared to the vehicle seat 100 in FIG. 11, in which illustration additional structure covers the bracket 1200. The main link 1100 and the fixed pivots 1104 and 112 are shown, and the main link 108 is omitted for illustrative purposes. The bracket 1200 can be used for mounting the fixed pivots 1104 and 112 to the vehicle body. In some implementations, either or both of the fixed pivots 1104 and 112 can be provided with a biasing member (including, but not limited to, a torsion spring) to bias the vehicle seat away from the stowed position. This bias can reduce the effort for the occupant in transitioning the vehicle seat into the folded position (FIG. 3). Once the vehicle seat is in the folded position of FIG. 3, the backrest frame can be raised to its use position, and the headrest be unfolded, so that the vehicle seat again assumes the use position of FIG. 1.

The terms "substantially" and "about" used throughout this Specification are used to describe and account for small fluctuations, such as due to variations in processing. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%. Also, when used herein, an indefinite article such as "a" or "an" means "at least one."

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

A number of implementations have been described. Nevertheless, it will be understood that various modifications may be made without departing from the spirit and scope of the specification.

In addition, the logic flows depicted in the figures do not require the particular order shown, or sequential order, to achieve desirable results. In addition, other processes may be provided, or processes may be eliminated, from the described flows, and other components may be added to, or removed from, the described systems. Accordingly, other implementations are within the scope of the following claims.

While certain features of the described implementations have been illustrated as described herein, many modifications, substitutions, changes and equivalents will now occur to those skilled in the art. It is, therefore, to be understood that appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A vehicle seat comprising:

a cushion frame;

a backrest frame;

at least one main link extending between a first pivot at the cushion frame and a first fixed pivot to be mounted to a vehicle body of a vehicle; and a break link extending between a second pivot at the cushion frame and a second fixed pivot to be mounted to the vehicle body, the break link comprising first and second members joined to each other at a third pivot, wherein one of the first or second members has a pin that extends into an elongate slot on another of the first or second members.

2. The vehicle seat of claim 1, wherein the at least one main link and the break link are configured to transition between acting as a five-bar link and acting as a four-bar link.

3. The vehicle seat of claim 2, wherein the five-bar link comprises:

a first bar including the at least one main link;

a second bar comprising a portion of the vehicle body between the first and second fixed pivots;

a third bar comprising the first member, wherein the first member extends at least between the second fixed pivot and the third pivot;

a fourth bar comprising the second member, wherein the second member extends at least between the third pivot and the second pivot; and a fifth bar comprising a portion of the cushion frame between the second pivot and the first pivot.

4. The vehicle seat of claim 2, wherein the four-bar link comprises:

a first bar including the at least one main link;

a second bar comprising a portion of the vehicle body between the first and second fixed pivots;

a third bar comprising the break link; and a fourth bar comprising a portion of the cushion frame between the second pivot and the first pivot.

5. The vehicle seat of claim 1, wherein the elongate slot includes a first end opposite a second end, and wherein the break link is locked by the pin abutting the first end.

6. The vehicle seat of claim 5, further comprising a biasing member that biases the pin toward the first end, the biasing member positioned at the other of the first or second members that has the elongate slot.

7. The vehicle seat of claim 6, wherein the biasing member comprises a clock spring.

8. The vehicle seat of claim 5, wherein the first member extends at least between the second fixed pivot and the third pivot.

9. The vehicle seat of claim 8, further comprising a riding pin on the first member, wherein the break link is unlocked by the riding pin riding on the main link.

10. The vehicle seat of claim 9 wherein the pin and the riding pin are substantially parallel to each other.

11. The vehicle seat of claim 9, wherein the at least one main link and the break link are configured to transition from initially acting as a five-bar link, thereafter into acting as a four-bar link when the break link is locked, and thereafter into again acting as the five-bar link when the break link is unlocked.

12. The vehicle seat of claim 8, wherein the elongate slot is positioned on the first member, and wherein the elongate slot is positioned at an opposite side of the third pivot from the first fixed pivot.

13. The vehicle seat of claim 12, wherein the first member has an angled end at the opposite side of the third pivot, and wherein the elongate slot is positioned on the angled end.

14. The vehicle seat of claim 13, wherein the second member is straight between the third pivot and the second pivot.

15. The vehicle seat of claim 1, wherein the vehicle seat comprises first and second main links, the first main link extending between the first pivot and the first fixed pivot, the second main link extending between a fourth pivot at the cushion frame and a third fixed pivot to be mounted to the vehicle body, wherein the first and second main links are configured to support substantially the entire load on the vehicle seat.

16. The vehicle seat of claim 15, wherein the first and third fixed pivots are positioned side by side in a transverse direction of the vehicle, and wherein the first and second main links are positioned side by side in the transverse direction of the vehicle.

17. The vehicle seat of claim 1, wherein the vehicle seat is configured to assume a use position and a stowed position.

18. The vehicle seat of claim 17, wherein the vehicle seat is configured to be transitioned from the use position to the stowed position by being stowed in a rearward direction relative to the vehicle.

19. A vehicle comprising:

a vehicle body, the vehicle body including a tub compartment; and a first seat including a cushion frame and a backrest frame, the first seat mounted to the vehicle body by at least one first main link and a first break link, wherein the first seat is accommodated inside the tub compartment by being folded rearward from a use position into a stowed position.

20. The vehicle of claim 19, wherein the at least one first main link and the first break link are configured to transition between acting as a five-bar link and acting as a four-bar link.

\* \* \* \* \*